H. E. RANDALL.
AUTOMOBILE CURTAIN CARRIER.
APPLICATION FILED MAY 14, 1915.
1,240,091.
Patented Sept. 11, 1917.
3 SHEETS—SHEET 1.
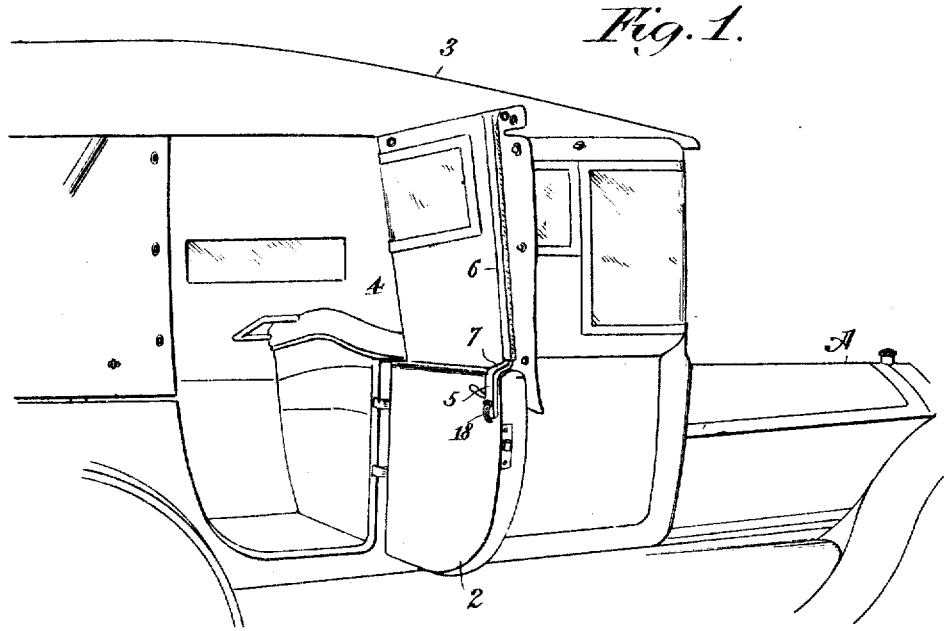
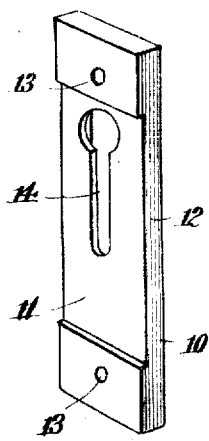
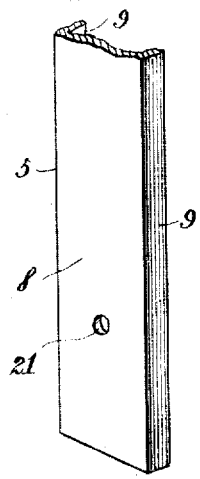
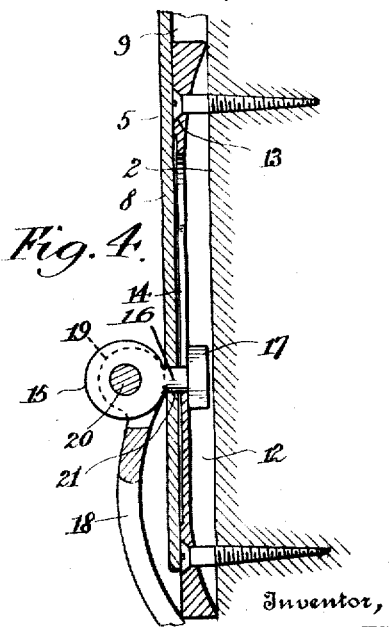
Witnesses:
E. Feinle Jr.
P. M. Smith
Inventor,
Harrie E. Randall.
By Victor J. Evans,
Attorney

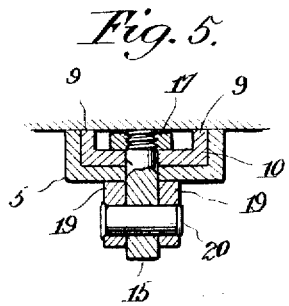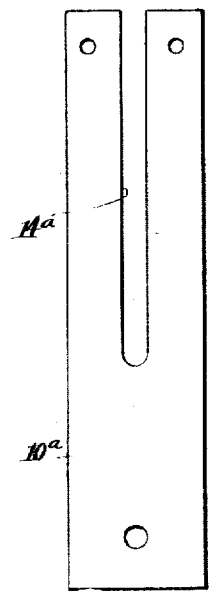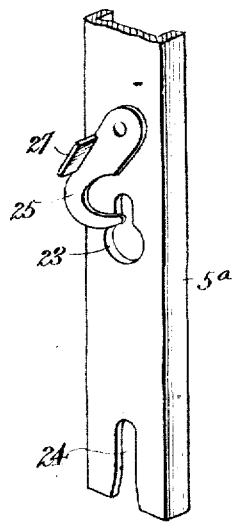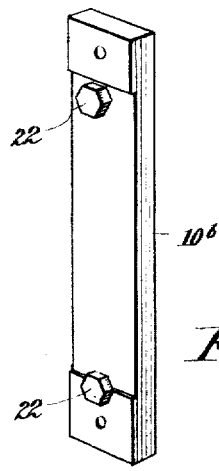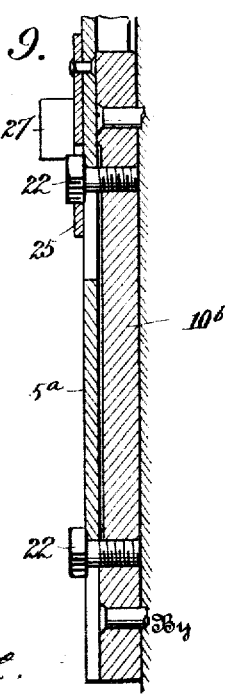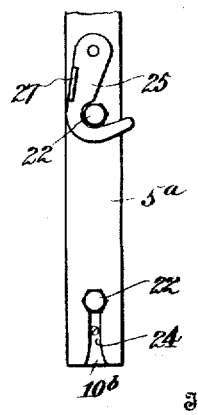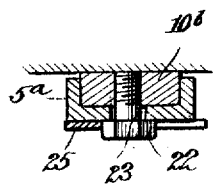

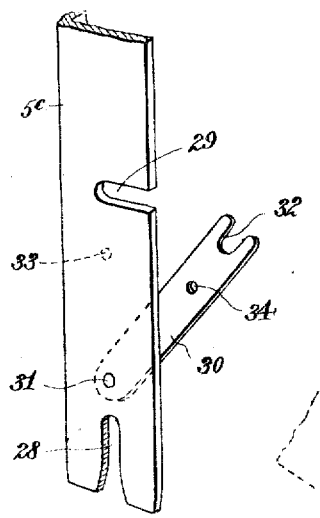
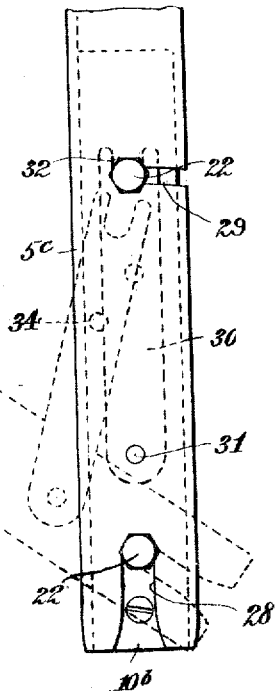
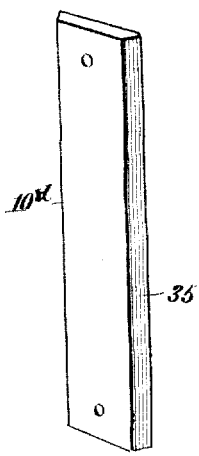
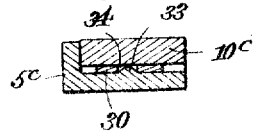
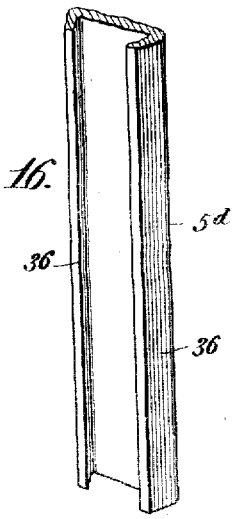
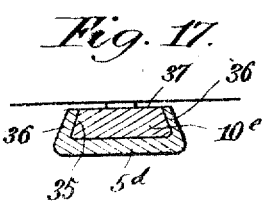
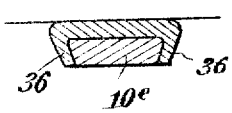

UNITED STATES PATENT OFFICE.

HARRIE E. RANDALL, OF VANDALIA, OHIO.

AUTOMOBILE-CURTAIN CARRIER.

1,240,091.  Specification of Letters Patent.  Patented Sept. 11, 1917.

Application filed May 14, 1915. Serial No. 28,156.

*To all whom it may concern:*

Be it known that I, HARRIE E. RANDALL, a citizen of the United States, residing at Vandalia, in the county of Montgomery and State of Ohio, have invented new and useful Improvements in Automobile-Curtain Carriers, of which the following is a specification.

This invention relates to curtain carriers for automobiles and similar vehicles, whereby access to and exit from the automobile is facilitated, the invention having for its object to produce a curtain carrier of such construction that it may be readily applied to and removed from the door of the machine and when in place on the door and used in conjunction with the curtain, it practically converts an open automobile into a limousine.

With the above general object in view, the invention consists in the novel construction, combination and arrangement of parts, as herein described, illustrated and claimed.

In the accompanying drawings:—

Figure 1 is a side elevation of a sufficient portion of an automobile to illustrate the application of the present invention thereto, showing one of the doors open.

Fig. 2 is a perspective view of what is hereinafter termed the door plate.

Fig. 3 is a similar view of the lower end portion of the curtain carrier or standard.

Fig. 4 is a longitudinal section showing the relation between the door plate and standard.

Fig. 5 is a cross section through the same.

Fig. 6 is a face view of a slightly modified form of door plate.

Fig. 7 is a perspective view of another form of standard.

Fig. 8 is a similar view of a door plate used in conjunction with the standard of Fig. 7.

Fig. 9 is a longitudinal section through the parts shown in Figs. 7 and 8.

Fig. 10 is a cross section through the same.

Fig. 11 is a face view of the parts showing the locking means for preventing relative movement thereof.

Fig. 12 is a perspective view of another form of standard.

Fig. 13 is a cross section through the same.

Fig. 14 is an elevation, showing the relation between the standard and door plate and the manner of connecting and disconnecting the same.

Fig. 15 is a perspective view of another form of door plate.

Fig. 16 is a similar view of another form of standard.

Fig. 17 is a cross section through the parts shown in Figs. 15 and 16.

Fig. 18 is a cross section showing a rearrangement of the parts shown in Fig. 17.

Referring to the drawings A generally designates an automobile, 2 one of the doors thereof, 3 the top and 4 the side curtains, one of which is shown as supported or carried by the door 2 and adapted to be opened and closed simultaneously therewith and thereby.

In carrying out the present invention I employ a curtain carrier or standard 5 of suitable height in accordance with the vertical extent of the side curtain 4 which is attached to said standard, said curtain 4 being provided with a pocket 6 to receive the standard 5, said standard being slipped into said pocket from the bottom end of the latter before the standard is fastened to the door. The standard is offset between its ends as shown at 7 to extend over but not touch the top edge of the door and permit the lower end portion of the standard to bear against the inside face of the door to which it is secured by the means now to be described.

Referring primarily to Figs. 2 to 5 inclusive which show the preferred embodiment of this invention, it will be seen that the lower end portion of the standard 5 is channeled as shown at 8 or provided with flanges 9 to enable the same to fit around or embrace a door plate 10 which is also preferably channeled as shown at 11 or provided with flanges 12 extending longitudinally of the opposite margins thereof. The door plate 10 is provided with holes 13 adapted to receive screws whereby it is fastened to the inner face of the door in fixed relation to the latter. Intermediate its ends the door plate 10 is provided with a key hole slot 14 the larger end of which is at the top, the same being designed to receive the eye-shaped member 15 of a clamping element, the member 15 being provided with a shank 16 having an enlarged shoulder 17 shown in the form of a head upon said shank, the shoulder 17 being of such size that it may be passed through the larger end of the key hole slot 14, permitting the shank 16 to be moved downwardly along the narrower portion of said slot. Connected to the eye member 15 is a cam lever 18, the head 19 of which is eccentric to the pivot 20 which connects said lever with the eye 15, the eccentric face of the cam lever being so arranged that when the lever is moved downwardly, the shoulder 17 is drawn tightly against the inner face of the door plate 11 thereby binding the standard against said door plate and preventing relative movement of said parts. The shank 16 passes through a hole 21 in the standard 5. Instead of forming the door plate 10 with a key hole slot, said plate indicated at 10ª in Fig. 6 may be provided with a slot 14ª which opens out at the upper extremity of the door plate as shown in Fig. 6.

It will be understood from the foregoing description that the door plate is fastened permanently to the inside face of the door and the standard 5 which carries the clamping device hereinabove described, is connected to the door plate by entering the part 17 in the slot of the door plate and then sliding the standard in a downward direction. When the shank 16 reaches the lower end of the slot in the door plate, the two parts are firmly clamped together by the operation of the cam lever 18.

Referring to Figs. 7 to 11 inclusive, it will be observed that instead of providing the door plate with a slot as hereinabove described, the door plate may be formed as shown at 10ᵇ in Fig. 8, said plate being fastened directly to the door and provided with outwardly extending headed studs 22 while the standard which is of the same channel iron construction, or flat, if preferred, is provided with upper and lower slots 23 and 24 respectively adapting the standard to be placed over the door plate until the studs 22 are received in the slots of the standard, whereupon the standard is slid downwardly until it reaches its final position. When such position is obtained, relative movement between the door plate and standard is prevented by a locking device shown in the form of a hook 25 pivotally mounted at 26 on the standard 5ª, the hook being adapted to engage under one of the studs 22 and being provided with an operating finger piece or projection 27 as shown in Fig. 11.

Instead of forming the standard of channel iron or a flat bar as previously described, it may consist of angle iron as shown in Figs. 12 and 14 and used in conjunction with the door plate 10ᵇ shown in Fig. 8. The standard 5ᶜ shown in Fig. 12 is provided at its lower extremity with an open longitudinal slot 28 and at a higher elevation with an open laterally extending or transverse slot 29, said slots being adapted to receive the studs 22 of the door plate 10ᵇ. A latch 30 is pivotally connected at 31 to the standard 5ᶜ and has a forked or slotted extremity as at 32 to engage one of the studs 22 above referred to. The latch 30 is provided on its inner face with a projection 33 which enters a socket 34 in the standard 5ᶜ. In Fig. 14, the manner of connecting the standard with the door plate is illustrated by dotted and full lines, the standard being first inclined to one side in relation to the fixed door plate while the forked end of the latch 30 is engaged with the upper stud 23. Then the standard 5ᶜ is rocked to a vertical position, causing the slot 29 to receive the stud 22 and at the same time causing the projection 33 of the latch to snap into the socket 34 in the standard. The standard and door plate are thus locked against relative movement in all directions.

In Figs. 15 to 17 inclusive, I have shown the door plate 10ᵈ as of dove-tail shape in cross section, provided with the inwardly converging side edges 35. The standard 5ᵈ is of corresponding shape in cross section or provided with the inwardly converging flanges 36 enabling the standard to be slid in a downward direction over the door plate 10ᵈ and when in place, any suitable means may be provided for clamping or locking the members 5ᵈ and 10ᵈ together thereby preventing relative movement of said members in all directions.

Under the arrangement shown in Fig. 17, the face 37 being of less area than the door plate bears directly against the inside face of the door. In Fig. 18, the door plate indicated at 10ᵉ is reversed or turned side for side as compared with the arrangement shown in Fig. 17 and the wider face thereof is disposed toward the inside face of the door thereby enabling the standard 5ᵉ which corresponds with the standard 5ᵈ of Fig. 17 to be slid downwardly between the door plate 10ᵉ and the inside face of the door. Again any suitable means may be employed for clamping or locking the members 5ᵉ and 10ᵉ together to prevent relative movement thereof in any direction.

From the foregoing description, taken in connection with the accompanying drawings, it will now be understood that the curtain supporting or carrying standard is easily, quickly and conveniently fastened to the door by the means hereinabove particularly described. It is the work of a moment to slip the carrier into the pocket 4 of the curtain and then place the offset lower end portion of said standard into interlocked engagement with the door-plate or, in other words, a plate secured in fixed relation to the door. The offset 7 of the carrier may, if desired, rest directly upon the top of the door but in order to avoid marring the finish of the door, it is preferred to allow the offset 7 to be arranged slightly above the top of the door and have the standard as a whole supported directly by the door plate. When the curtain is thus attached to the door by the means described and as shown in Fig. 1, an open touring car carrying side curtains is converted in effect into a closed limousine, the operator and passengers entering and leaving the machine with the same facility as in a car having no side curtains or a limousine. The standards may be of plain or channel iron as desired.

What I claim is:—

1. The combination with a vehicle door, of a side curtain carrier embodying a longitudinally channeled curtain holding standard extending above the top of the door to a point substantially on a level with the top cover, means for detachably fastening said standard to said door, said means comprising a standard retaining door plate receivable in the channel of said standard and in relation to which said standard is slidable, and means for clamping said standard and door plate together including a pivotally mounted cam lever.

2. The combination with a vehicle door, of a side curtain carrier embodying a longitudinally channeled curtain holding standard extending above the top of the door to a point substantially on a level with the top cover, means for detachably fastening said standard to said door, said means comprising a standard retaining door plate receivable in the channel of said standard and in relation to which said standard is slidable, and means for clamping said standard and door plate together including a pivotally mounted cam lever carried by said standard.

3. The combination with a vehicle door, of a side curtain carrier embodying a curtain holding standard extending above the top of the door to a point substantially on a level with the top cover, and means for detachably fastening said standard to said door, said means comprising a standard retaining door plate fastened to the door and in relation to which said standard is slidable, one of said members having a laterally opening channel extending longitudinally of one face thereof to slidingly receive the other member, and clamping means carried by said standard, slidable in relation to the door plate, and adapted to engage the latter to prevent vertical movement of the standard.

4. The combination with a vehicle door, of a side curtain carrier embodying a channeled curtain holding standard extending above the top of the door to a point substantially on a level with the top cover, means for detachably fastening said standard to said door, said means embodying a slotted door plate, a headed projection on said standard shiftable in relation thereto and insertible through said slotted door plate, and means for shifting said projection into clamping engagement with the door plate to prevent vertical movement of said standard in relation to the door plate.

In testimony whereof I affix my signature in presence of two witnesses.

HARRIE E. RANDALL.

Witnesses:
  CHARLES E. WINSTEAD,
  WM. H. GIBSON.